US007243207B1

(12) United States Patent
Prakash et al.

(10) Patent No.: US 7,243,207 B1
(45) Date of Patent: Jul. 10, 2007

(54) TECHNIQUE FOR TRANSLATING A PURE VIRTUAL FILE SYSTEM DATA STREAM INTO A HYBRID VIRTUAL VOLUME

(75) Inventors: Ashish Prakash, Morrisville, NC (US); Robert L. Fair, Cary, NC (US); John K. Edwards, Sunnyvale, CA (US); Eric Hamilton, Durham, NC (US); Robert M. English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 464 days.

(21) Appl. No.: 10/950,893

(22) Filed: Sep. 27, 2004

(51) Int. Cl.
G06F 12/02 (2006.01)
(52) U.S. Cl. .............................. 711/202; 711/209; 718/1
(58) Field of Classification Search ................ 711/202, 711/209; 718/1
See application file for complete search history.

(56) References Cited

U.S. PATENT DOCUMENTS

| | | | |
|---|---|---|---|
| 4,156,907 A | 5/1979 | Rawlings et al. |
| 4,399,503 A | 8/1983 | Hawley |
| 4,598,357 A | 7/1986 | Swenson et al. |
| 4,688,221 A | 8/1987 | Nakamura et al. |
| 4,698,808 A | 10/1987 | Ishii |
| 4,761,785 A | 8/1988 | Clark et al. |
| 4,805,090 A | 2/1989 | Coogan |
| 4,837,675 A | 6/1989 | Bean et al. |
| 4,864,497 A | 9/1989 | Lowry et al. |
| 4,896,259 A | 1/1990 | Jacobs et al. |
| 4,899,342 A | 2/1990 | Potter et al. |
| 4,989,206 A | 1/1991 | Dunphy, Jr. et al. |
| 5,124,987 A | 6/1992 | Milligan et al. |
| RE34,100 E | 10/1992 | Hartness |
| 5,155,835 A | 10/1992 | Belsan |
| 5,426,747 A | 6/1995 | Weinreb et al. |
| 5,581,724 A | 12/1996 | Belsan et al. |
| 5,819,292 A | 10/1998 | Hitz et al. |
| 6,574,591 B1 | 6/2003 | Kleiman et al. |
| 6,604,118 B2 | 8/2003 | Kleinman et al. |

(Continued)

FOREIGN PATENT DOCUMENTS

WO           WO89/10594           11/1989

OTHER PUBLICATIONS 112056-158, Fair et al., Sep. 27, 2004.

(Continued)

*Primary Examiner*—Kevin L. Ellis
(74) *Attorney, Agent, or Firm*—Cesari & McKenna, LLP

(57) ABSTRACT

A technique converts a stream of virtual volume block numbers (vvbns) into a hybrid virtual volume (vvol) file system containing both physical volume block numbers (pvbns) and vvbns. The stream of vvbns is illustratively embodied as a file system data stream of a vvol that is transferred by a source to a destination in accordance with image transfer operations, such as volume copying and synchronous or asynchronous mirroring. Transfer of the vvol involves converting a file system on the source vvol into the file system data stream (i.e., a "pure" vvol stream), where all blocks of the vvol are represented by vvbns. The file system data stream is then transferred to the destination, where the vvbns of the pure vvol stream blocks are converted to pvbns of a hybrid stream.

20 Claims, 9 Drawing Sheets

U.S. PATENT DOCUMENTS 6,636,879 B1  10/2003  Doucette et al.

OTHER PUBLICATIONS 112056-153, Edwards et al., Apr. 30, 2004.
David Hitz et al., File System Design for an NFS File Server Appliance TR 3002, Network Appliance Inc.
Administration Guide found at http://www.openafs.org/pages/doc/AdminGuide/auagd010.htm, visited on Mar. 2, 2005.
Basilico, et al., *Error Correction System Using "Shadow Memory,"* IBM Technical Disclosure Bulletin, May 1984, pp. 5792-5793.
Bitton, Dina, *Disk Shadowing*, Proceedings of the 14th VLDB Conference, LA, CA (1988).
Blasgen, M.W. et al., *System R:An architectural Overview*, Reprinted from IBM Systems Journal vol. 20, No. 1, 1981© 1981, 1999.
Borenstein, Nathaniel S., *CMU's Andrew project a tetrospective*, Communicaitons of ACM, (39)12, Dec. 1996.
Brown, Mark R. et al., *The Alpine file systems*, ACM Transactions on Computing Systems, 3(4):261-293, Nov. 1985.
Chen, Peter M., et al., *An Evaluation of Redundant Arrays of Disks Using an Amdahl 5890* Performance Evaluation, pp. 74-85, 1990.
Chutani, Sailesh, et al., *The Episode file system*, In Proceedings of the USENIX Winter 1992.
Clark, B.E., et al., *Application System /400 Performance Characteristics*, IBM Systems Journal, 28(3):407-423, 1989.
Data Sheet for the Check Point Software Technologies product Flood-Gate-1 (1997).
Dibble, Peter C., et al., Beyond Striping: The Bridge Multiprocessor File System, Computer Science Department, University of Rochester, Aug. 11, 1989.
Douglis, Fred, et al., *A comparison of two distributed systems: Amoeba and Sprite*—Computing Systems, 4(4), Fall 1991, pp. 353-385 ?{copy of article I have has no date or cite}.
Gait, Jason, *Phoenix: A Safe In-Memory File System*, Communications of the ACM, 33(1):81-86, Jan. 1990.
Hartman, John H. et al., *Performance Measurements of a Multiprocessor Sprite Kernal*, Proceedings of the USENIX Conference, 1990.
Hitz, Dave et al., *File System Design for an NFS File Server Appliance*, Technical Report 3002, Rev. C395, presented Jan. 19, 1994.
Howard, John H, et al. *Scale and Performance in a Distribution File System*, Carnegie Mellon Universtiy, CMU-ITC-87-068. Aug. 5, 1987.
Howard, John H. et al., *Scale and performance in a distributed file system*, ACM Trans. Computer. System., 6(1), Feb. 1988 pp. 51-81.
Howard, John H., *An Overview of the Andrew File System*, Carnegie Mellon University, CMU-ITC-88-062.
*The IBM System/38*, Chapter 8, pp. 137-115.
Isomaki, Markus, *Differentiated Service for the Internet*, Department of Technical Physics and Mathematics, May 9, 1998.
Kazar, Michael L., et al., *Decarum File System Architectural Overview*, USENIX Summer Conference, Anaheim, California, 1990.
Lomet, David., et al., *The Performance of a multiversion access method*, ACM SIGMOND International Conference on Management of Data, 19:353-363.
Lorie, Raymond, A, *Physical integrity in a large segmented database*, ACM Trans. Database Systems, (2)1: 91-104, Mar. 1977.
Lorie, RA, *Shadow Page Mechanism*, IBM Technical Disclosure Bulletin, Jun. 1986, pp. 340-342.
McKusick, Marshall Kirk, et al., *A Fast File System for UNIX*, Computer Science Division, Department of Electrical Engineering and Computer Sciences, Univ., of CA, Berkley, Feb. 18, 1994.
Miller, Ethan L., et al., *RAMA:A File Systems for Massively Parallel Computers*, 12th IEEE Symposium on Mass Storage Systems, Monterey CA, Apri. 1993, pp. 163-168.
Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.
Mullender, Sape J., et al., *A distributed file service based on optimistic concurrency control*, ACM Symposium on Operating System Principles (Oreas Island, Washington). Published as Operating Systems Review, 19(5):51-62, Dec. 1985.
Muller, Keith, et al., *A High Performance Multi-Structured File System Design*, In Proceedings of the 13th ACM Symposium on Operating Systems Principles, Oct. 1991, pp. 56-67.
Ousterhout, John K. et al. *The Sprite Network Operating System*, Computer Science Division, Department of Electrical Engineering and Computer Sciences, Univ. of CA, Berkley, Nov. 19, 1987.
Ousterhout, John et al., *Beating the I/O Bottleneck: A Case for Log-Structured File Systems*, Technical Report, Computer Science Division, Electrical Engineering and Computer Sciences, Universit of California at Berkeley, Oct. 30, 1988.
Ousterhout, John, *Why Aren't Operating Systems Getting Faster as Fast as Hardware?*, Digital WRL Technical Note TN-11, Oct. 1989.
Ousterhout, John, *A Brief Retrospective On The Sprite Network Operating System*, found at http://www.cs.berkeley.edu/projects/sprite/retrospective.html.visited on Mar. 11, 2005.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).
Patterson, D., et al., *A Case for Redundant Arrays of Inexpensive Disks (RAID)*, SIGMOND International Conference on management of Data, Chicago, IL, USA, Jun. 1-3, 1988, SIGMOND Record (17)3:109-116 (Sep. 1988).
Peterson, Zachary Nathaniel Joseph, *Data Placement for Copy-on-Write Using Virtual Contiguity*, University of CA, Santa Cruz, Master of Science in Computer Science Thesis, Sep. 2002.
Quinlan, Sean, *A Cached WORM File System*, Software-Practice and Experience, 21(12):1289-1299.
Redundant Array of Independent Disks, from Wikipedia, the free encyclopedia, found at http://en.wikipedia.org/wiki/RAID, visited on Mar. 9, 2005.
Rosenberg, J., et al., *Stability in a Persisten Store Based on a Large Virtual Memory*, In Security and Persistence, Rosenber, J. & Keedy, J.L. (ed), Springer-Verlag (1990) pp. 229-245.
Rosenblum, Mendel, et al., *The LFS Storage Manager*, Computer Science Division, Electrical Engin. And Computer Science, Univ. of CA, presented at Summer '90 USENIX Technical Conference, Anaheim, CA Jun. 1990.
Rosenblum, Mendel, et al, *The Design and Implementation of a Log-Structured File System* Jul. 24, 1991 pp. 1-15.
Rosenblum, Mendel, et al., *The Design and Implementation of a Log-Structured File System*, In Proceedings of ACM Transactions on Computer Systems, (10)1:26-52, Feb. 1992.
Sandberg, Russel et al., *Design and implementation of the Sun Network Filesystem*, In Proc. Summer 1985 USENIX Conf., pp. 119-130, Portland OR (USA), Jun. 1985.
Santry, Douglas S., et al., *Deciding When to Forget in the Elephant File System*,Operating Systems Review, 34(5), (Dec. 1999) pp. 110-123.
Satyanarayanan, M., et al., *The ITC Distributed File System: Principles and Design*, In Proceedings of the 10th ACM Symposium on Operating Systems Principles, (19)5:56-67, Dec. 1985.
Satyanarayanan,.M.. *A survey of distributed file-systems*, Annual Review of Computing Science, 4(73-104), 1989.
Satyanarayanan, M., et al, *Coda: A highly available file system for a distributed workstation environment* Carnegie Mellon University, CMU-ITC.
Satyanarayanan, M., et al, *Coda: A highly available file system for a distributed workstation environment*. IEEE Transactions on Computers, 39(4):447-459, 1990.
Satyanarayanan, Mahadev, *Scalable, Secure, and Highly Available Distributed File Access*, Computer May 1990: 9-21.
Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGiude/auusg004.htm, visited on Mar. 2, 2005.

Welch, Brent B., et al., *Pseudo Devices; User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1991.

TECHNIQUE FOR TRANSLATING A PURE VIRTUAL FILE SYSTEM DATA STREAM INTO A HYBRID VIRTUAL VOLUME

CROSS-REFERENCE TO RELATED APPLICATIONS

The present invention is related to the following commonly assigned U.S. patent application Ser. No. 10/951,196 titled, Technique for Translating a Hybrid Virtual Volume File System into a Pure Virtual File System Data Stream, filed on even date herewith and hereby incorporated by reference as though fully set forth herein.

FIELD OF THE INVENTION

The present invention relates to storage systems and, more specifically, to transfer of a volume between a source and a destination on either the same storage system or across a network.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n–1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The write-anywhere file system (such as the WAFL file system) has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL file system, snapshots are described in *TR3002 File System Design for a NFS File Server Appliance* by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though full set forth herein.

U.S. patent application Ser. No. 10/836,817 titled Extension of Write Anywhere File System Layout, by John K. Edwards et al. and assigned to Network Appliance, Inc., describes a file system layout that apportions an underlying physical volume into one or more virtual volumes (vvols) of a storage system. The underlying physical volume is an aggregate comprising one or more groups of disks, such as RAID groups, of the storage system. The aggregate is apportioned into one or more virtual volumes (vvols) of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks (e.g., level 0 blocks) and indirect blocks (e.g., level 1 blocks) that contain block pointers that point at either other indirect blocks or data blocks. In a hybrid vvol design, these block pointers are pvbns in the aggregate that hosts the vvol, whereas in a dual vbn hybrid vvol design, the block pointers are both pvbns and vvbns. Notably, pvbns reference locations on disks of the aggregate, while vvbns reference locations within files of the vvol.

Transferring such hybrid vvols between source and destination aggregates either on the same storage system or across a network poses the problem of "interpreting" these block pointers on the source and destination, and transforming them into a format that allows the destination to recreate the same vvol in terms of data and snapshots as it existed at the source. Such format transformation means that the appropriate (indirect) block pointers on both the source and destination of an image transfer provide access to exactly the same data blocks. If a hybrid vvol is transferred by simply moving blocks and putting them in place on the destination, data integrity will be violated since the mapping between pvbns on the source and destination is not the same.

Specifically, when performing an image transfer the pvbn indirect block pointers on the source, which reference locations on disks attached to the source, have no meaning on the destination and, in particular, to locations on disks coupled to the destination. The image transfer may be performed in accordance with a volume replication facility and typically comprises a file system data stream that is provided by the source to a destination via image transfer operations, such as volume copying and synchronous or asynchronous mirroring. The image transfer operations typically operate on the granularity of a vvol and transfer all the blocks of a source vvol to a destination vvol on an aggregate of the destination. The pvbn block pointers in the indirect blocks (or inodes) on the source vvol may not exist on the destination (or may not be available on the destination) for many reasons such as, e.g., when going from a larger aggregate on the source to a smaller aggregate on the destination. Thus, a technique is needed to convert the pvbn block pointers in the indirect blocks on the source into block pointers that "make sense" on the destination.

SUMMARY OF THE INVENTION

The present invention is directed to a technique for converting a stream of virtual volume block numbers (vvbns) into a hybrid virtual volume (vvol) file system containing both physical volume block numbers (pvbns) and vvbns. The stream of vvbns is illustratively embodied as a file system data stream of a vvol that is transferred by a source to a destination in accordance with image transfer operations, such as volume copying and synchronous or asynchronous mirroring. Transfer of the vvol involves converting a file system on the source vvol into the file system data stream (i.e., a "pure" vvol stream), where all blocks of the vvol are represented by vvbns. The file system data stream is then transferred to the destination, where the vvbns of the pure vvol stream blocks are converted to pvbns of a hybrid stream. The technique for converting a pure vvol stream into a hybrid stream is referred to herein as "destination swizzling".

As pure vvol blocks are received by the destination during a transfer stage, those blocks are either placed in a temporary blocks staging file or a destination vvol container file. The vvbn of each block indicates a logical offset within the container file (i.e., the container map) or blocks staging file at which the block is placed. Block type and level bits for indirect blocks and inode file blocks, as well as for metafile blocks, are stored in a temporary bits staging file. The block type and level bits are used to determine which blocks to "swizzle" (convert) once all the blocks have been transferred. Optimizations, such as writing a "chunk" of blocks and bits as they are received (write combining), may be made to facilitate performance during the transfer stage.

A swizzling stage involves conversion of the pure vvol stream into a hybrid stream implementation that makes the vvol usable, i.e., the swizzling stage involves the actual conversion of a vvbn to a pvbn. Broadly stated, destination swizzling involves using each non-zero block pointer in a block as an index into the container map of the destination vvol and replacing the vvbn of the block with a pvbn. Only blocks that have pointers to other blocks need to be swizzled; these blocks include all indirect blocks of regular files, as well as level 0 and indirect inode file blocks. Accordingly, level 0 blocks of regular files, which do not have pointers to other blocks, are placed into the container file and write allocated so that pvbns may be selected for them. File system information (fsinfo) and volume information (volinfo) metafile blocks require special handling during swizzling. Each fsinfo block contains a disk inode for the inode file for a file system (or snapshot), while the volinfo block contains pointers to the fsinfo blocks for all snapshots in a volume.

According to the inventive technique, blocks that need to be swizzled can be processed after all blocks they point at have been swizzled (and if they are in the blocks staging file, moved into the container file). As blocks are swizzled and, if required, moved into the container file, more blocks become eligible for swizzling and, optionally, moving. Swizzling starts with level 1 indirect blocks, since all level 0 blocks (other than level 0 inode file blocks which themselves hold block pointers) are already in place and have pvbns assigned to them after the transfer stage. In particular, swizzling of the indirect blocks starts at the level 1 indirect blocks and proceeds to the maximum level of indirect blocks allowed by the file system. The vvol on the destination takes a consistency point (CP) after each level of indirect blocks is swizzled to update the on-disk image of the indirect blocks so that the next level of blocks has pvbns at which to point. Thereafter, level 0 inode file blocks are swizzled followed by level 1 indirect inode file blocks and so on until all the inode file blocks have been swizzled.

Eventually, a small handful of unswizzled blocks are left that form a cycle (e.g., fsinfo blocks point at indirect blocks that point at indirect blocks that point at inode file blocks that point at blocks in the fsinfo metafile). These blocks are swizzled and optionally moved into the container file atomically at write allocation time when the pvbn assigned to each of them is known. These blocks are thus marked dirty for write allocation and a special flag is set on the container file inode so that a write allocator knows that these blocks need to be swizzled prior to flushing them to disk (during a CP). Special care is taken for cycle-detection and handling so that no blocks in a cycle are swizzled twice. A global linked list is maintained for all cycle data structures to deal with multiple simultaneous destination stream transfers and conversions.

Advantageously, the present invention allows vvols to be transferred and mirrored by taking a pure vvol stream of vvbns and converting it into a usable vvol file system on a destination. The novel destination swizzling technique may be used for volume copying, as well as synchronous and asynchronous mirroring. The use of write combining and staging files, as well as block type and level bit optimizations to swizzle only when required, are performance optimizations for the inventive technique.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
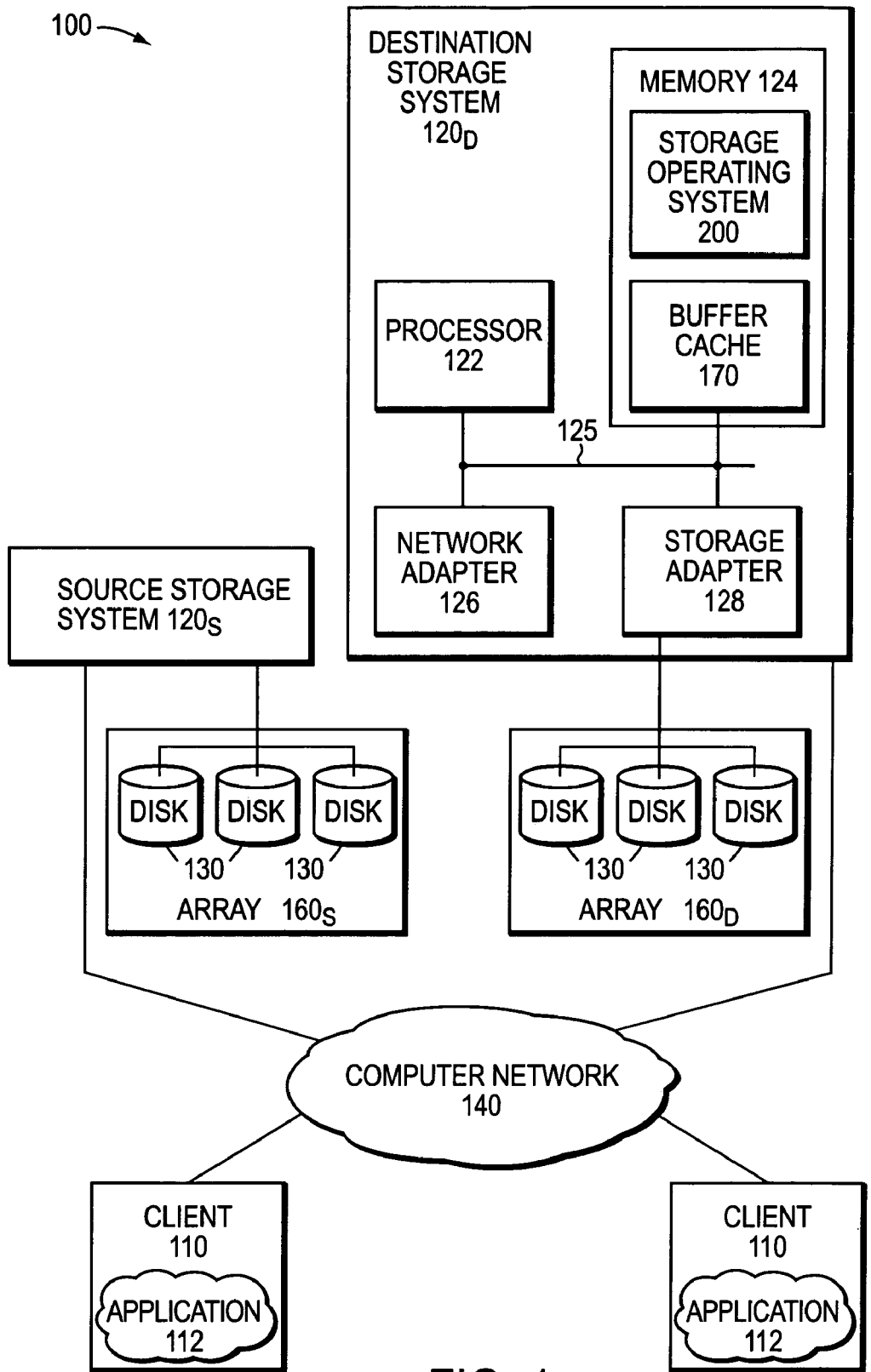
FIG. 1 is a schematic block diagram of a computer network including a plurality of storage systems that may be advantageously used with the present invention.

FIG. 1 is a schematic block diagram of a network environment 100 including a plurality of storage systems 120, such as source storage system $120_S$ and destination storage system $120_D$, that may be advantageously used with the present invention. Each storage system is a computer that provides storage service relating to the organization of information on storage devices, such as disks 130 of a disk array $160_{S,D}$. Each storage system $120_{S,D}$ comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the invention described herein.

The network adapter 126 comprises the mechanical, electrical and signaling circuitry needed to connect the storage system 120 to one of a plurality of clients 110 over a computer network 140, which may comprise a point-to-point connection or a shared medium, such as a local area network. Illustratively, the computer network 140 may be embodied as an Ethernet network or a Fibre Channel (FC) network. Each client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets over the network 140. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array $160_{S,D}$. The storage adapter includes input/output (I/O) interface circuitry that couples to the disks over an I/O interconnect arrangement, such as a conventional high-performance, FC serial link topology.

Storage of information on each array $160_{S,D}$ is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 2:
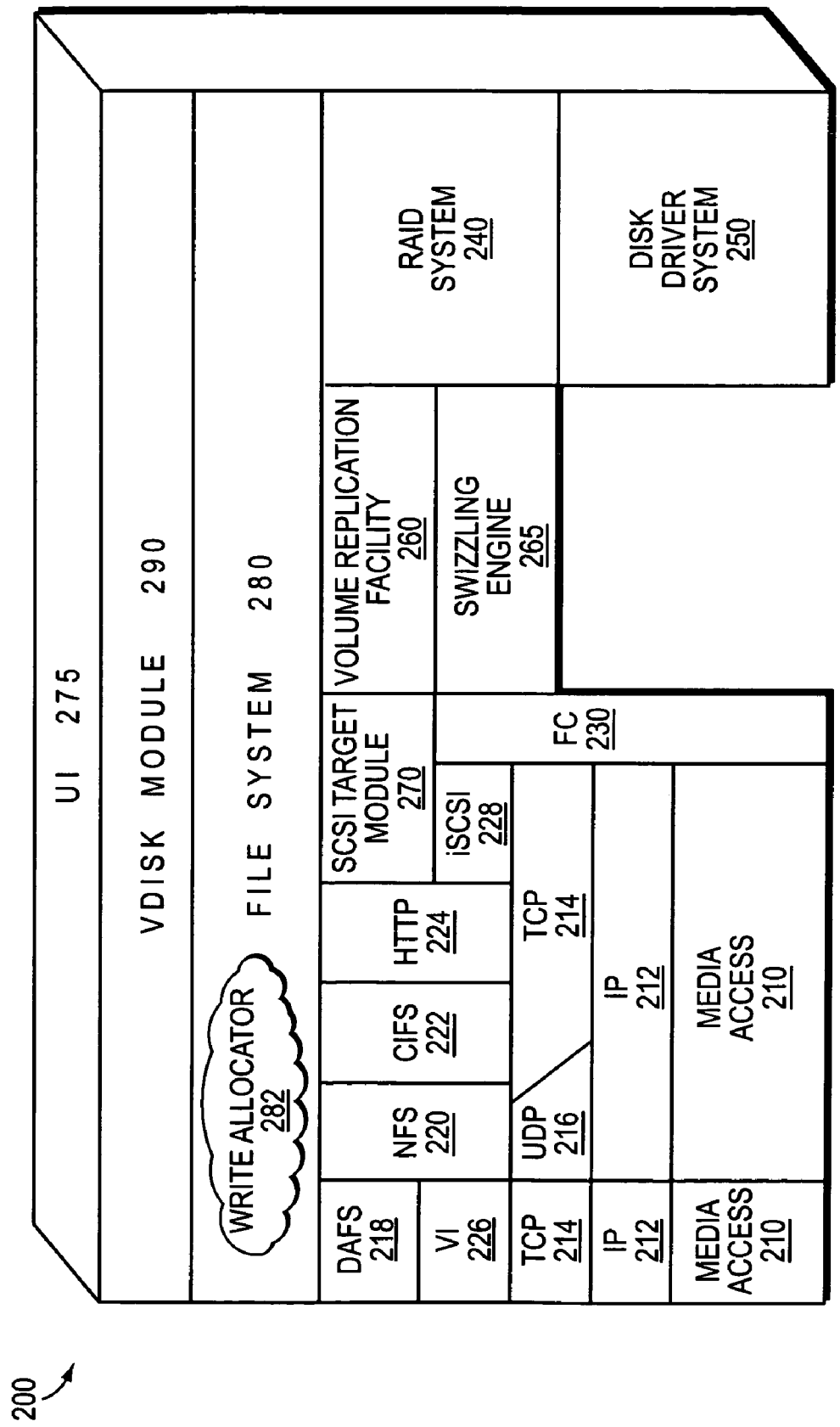
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs)

info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 110 is forwarded as a packet over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. patent application Ser. No. 10/215,917 titled, Multi-Protocol Storage Appliance that provides Integrated Support for File and Block Access Protocols, filed on Aug. 9, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
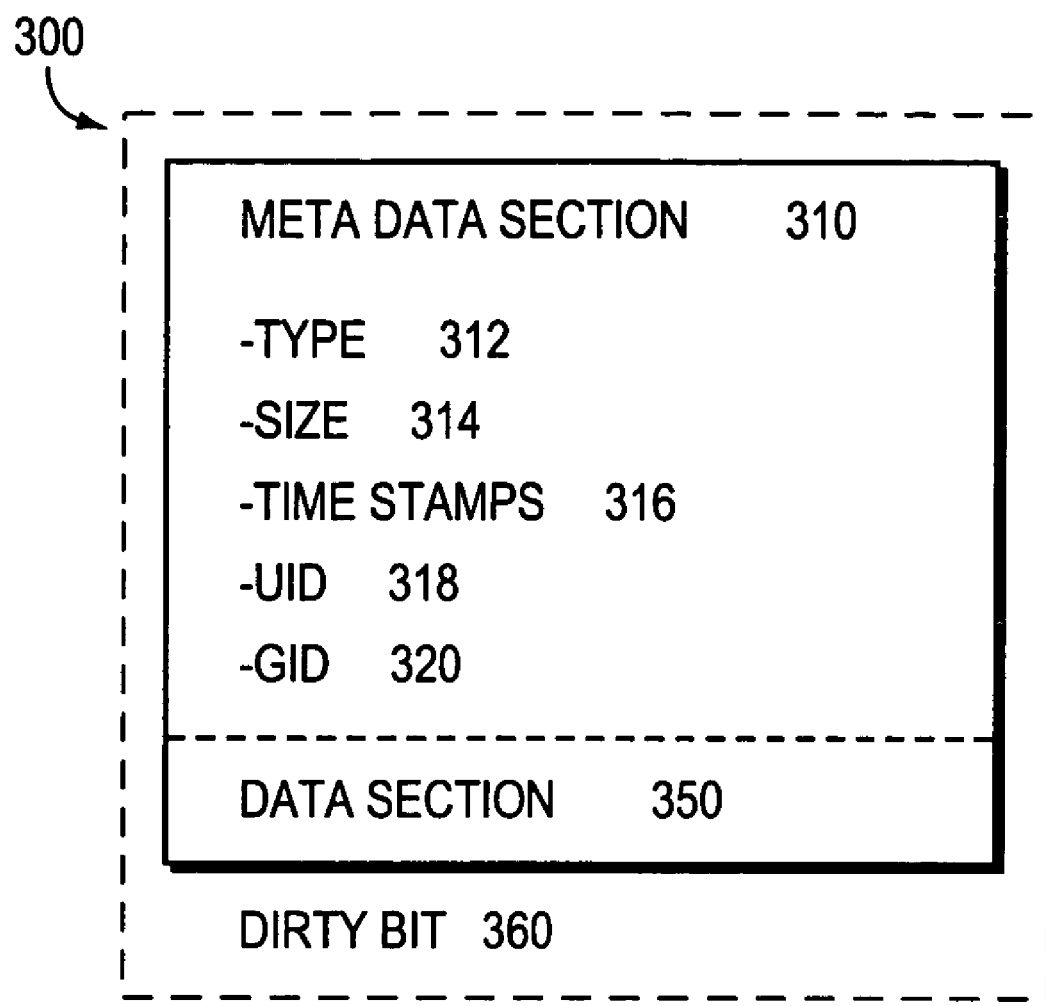
FIG. 3 is a schematic block diagram of an inode that may be advantageously used with the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 650 of the inode (e.g., a second level inode) references an indirect block (e.g., a first level block) that contains 1024 pointers, each of which references a 4 kB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 kB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled Method for Maintaining Consistent States of a File System and for Creating User-Accessible Read-Only Copies of a File System by David Hitz et al., issued on Oct. 6, 1998.

Figure 4:
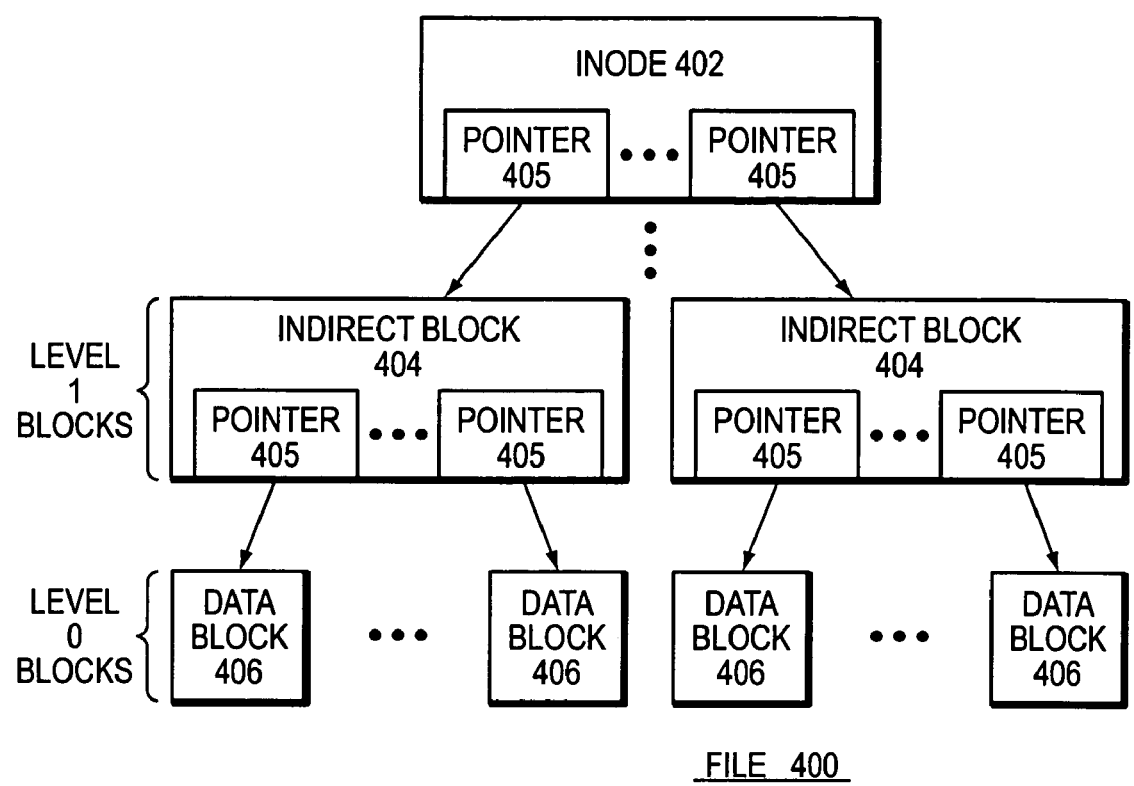
FIG. 4 is a schematic block diagram of a buffer tree of a file that may be advantageously used with the present invention.

FIG. 4 is a schematic block diagram of a buffer tree of a file that may be advantageously used with the present invention. The buffer tree is an internal representation of blocks for a file (e.g., file 400) loaded into the buffer cache 170 and maintained by the write-anywhere file system 280. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (vvols) of a storage system. An example of such a file system layout is described in U.S. patent application Ser. No. 10/836,817 titled Extension of Write Anywhere File System Layout, by John K. Edwards et al. and assigned to Network Appliance, Inc., which application is hereby incorporated by reference. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

In one embodiment, pvbns are used as block pointers within buffer trees of files (such as file 400) stored in a vvol. This illustrative "hybrid" vvol embodiment involves the insertion of only the pvbn in the parent indirect block (e.g., inode or indirect block). Use of pvbns avoids latency associated with translations from vvbns-to-pvbns, e.g., when servicing file system (such as NFS, CIFS) requests. On a read path of a logical volume, a "logical" volume (vol) info block has one or more pointers that reference one or more fsinfo blocks, each of which, in turn, "points to" an inode file and its corresponding inode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk,dbn occurs at the file system/RAID system boundary of the storage operating system 200.

In an alternate "dual vbn hybrid" vvol embodiment, both the pvbn and vvbn are inserted in the parent indirect (e.g., level 1) blocks in the buffer tree of a file, such as file 400. The pvbns reference locations on disks of the aggregate, whereas the vvbns reference locations within files of the vvol. The use of pvbns as block pointers 405 in the indirect blocks 404 provides efficiencies in the read paths, while the use of vvbn block pointers provide efficient access to required metadata. That is, when freeing a block of a file, the parent indirect block in the file contains readily available vvbn block pointers, which avoids the latency associated with accessing an owner map (described herein) to perform pvbn-to-vvbn translations; yet, on the read path, the pvbn is available. A disadvantage of this dual vbn variant is the increased size of indirection data (metadata) stored in each file.

Figure 5:
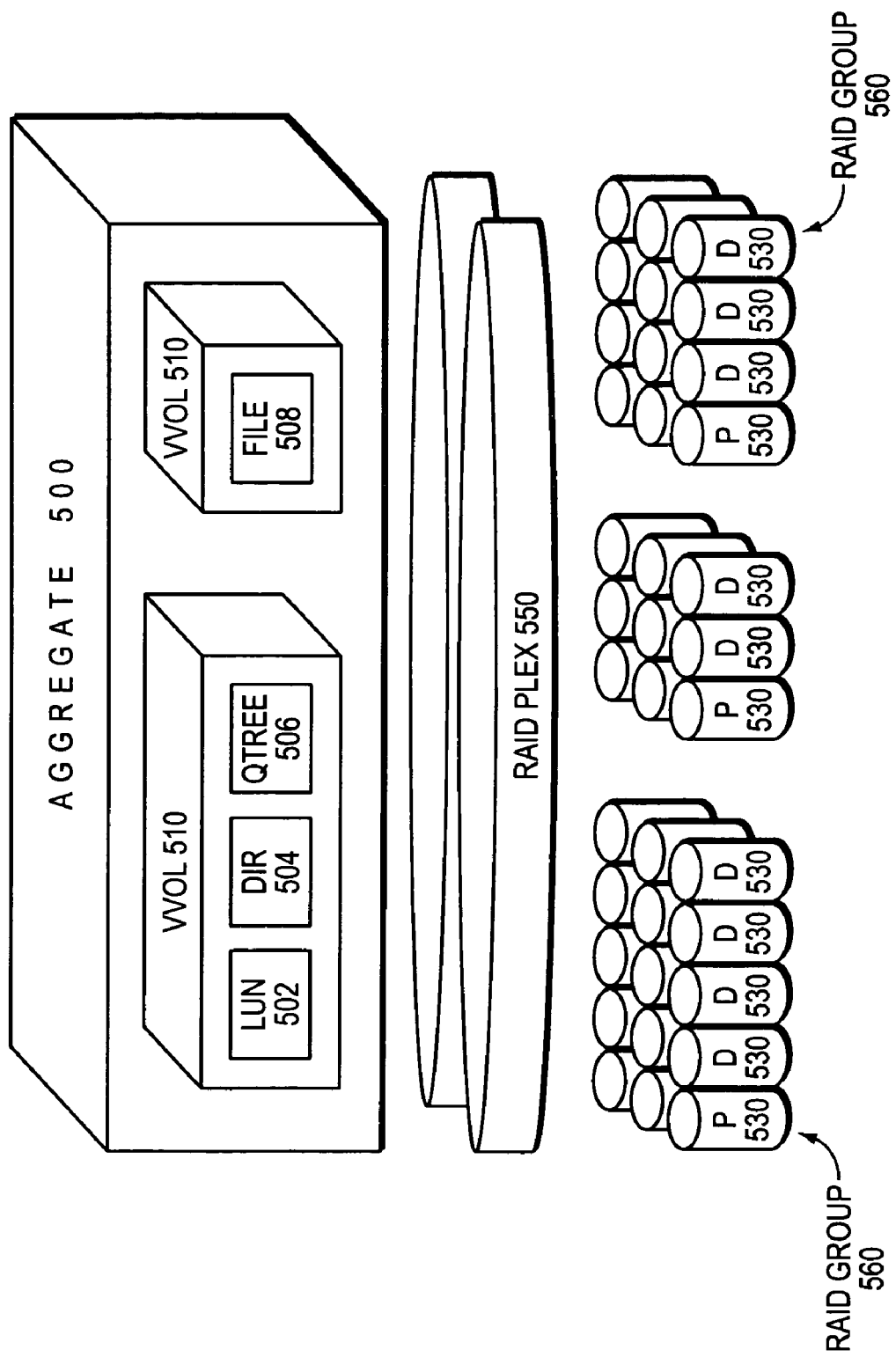
FIG. 5 is a schematic block diagram of an embodiment of an aggregate that may be advantageously used with the present invention.

FIG. 5 is a schematic block diagram of an embodiment of an aggregate 500 that may be advantageously used with the present invention. Luns (blocks) 502, directories 504, qtrees 506 and files 508 may be contained within vvols 510, such as hybrid vvols, that, in turn, are contained within the aggregate 500. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and at least one (P) parity disk.

Whereas the aggregate 500 is analogous to a physical volume of a conventional storage system, a vvol is analogous to a file within that physical volume. That is, the aggregate 500 may include one or more files, wherein each file contains a vvol 510 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 510 is also a logical volume, it has its own block allocation structures (e.g., active, space and summary maps) in its vvbn space.

Figure 6:
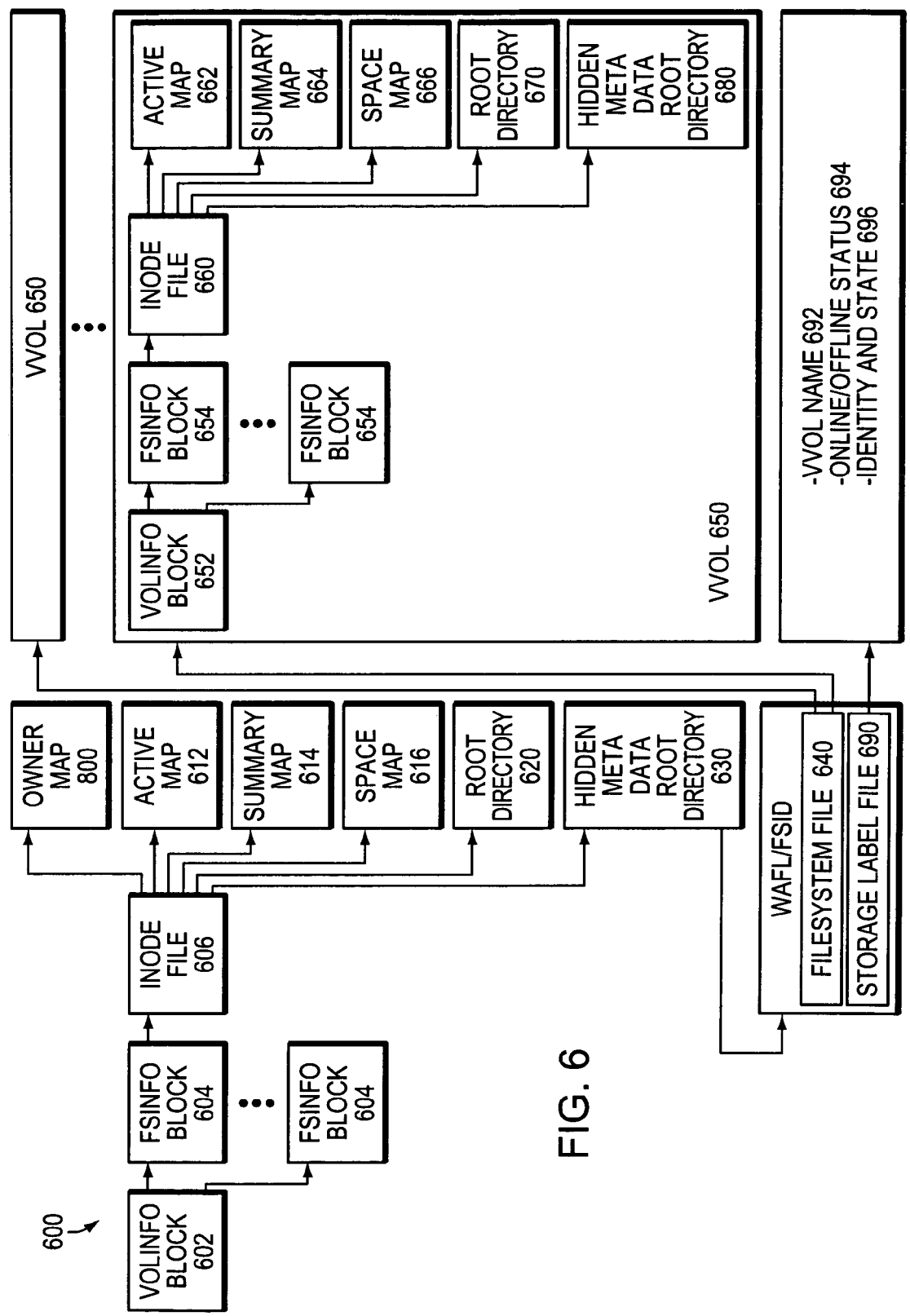
FIG. 6 is a schematic block diagram of an on-disk representation of an aggregate.

FIG. 6 is a schematic block diagram of an on-disk representation of an aggregate 600. The storage operating system 200, e.g., the RAID system 240, assembles a physical volume of pvbns to create the aggregate 600, with pvbns 1 and 2 comprising a "physical" volinfo block 602 for the aggregate. The volinfo block 602 contains block pointers to fsinfo blocks 604, each of which may represent a snapshot of the aggregate. Each fsinfo block 604 includes a block pointer to an inode file 606 that contains inodes of a plurality of files, including an owner map 800, an active map 612, a summary map 614 and a space map 616, as well as other special metadata files. The inode file 606 further includes a root directory 620 and a "hidden" metadata root directory 630, the latter of which includes a namespace having files related to a vvol in which users cannot "see" the files. The hidden metadata root directory also includes a WAFL/fsid/ directory structure, as described herein, which contains a filesystem file 640 and storage label file 690. Note that root directory 620 in the aggregate is empty; all files related to the aggregate are organized within the hidden metadata root directory 630.

The filesystem file 640 includes block pointers that reference various file systems embodied as vvols 650. The aggregate 600 maintains these vvols 650 at special reserved inode numbers. Each vvol 650 also has special reserved inode numbers within its vvol space that are used for, among other things, the block allocation bitmap structures. As noted, the block allocation bitmap structures, e.g., active map 662, summary map 664 and space map 666, are located in each vvol.

Specifically, each vvol 650 has the same inode file structure/content as the aggregate, with the exception that there is no owner map and no WAFL/fsid/filesystem file, storage label file directory structure in a hidden metadata root directory 680. To that end, each vvol 650 has a volinfo block 652 that points to one or more fsinfo blocks 654, each of which may represent a snapshot of the vvol. Each fsinfo block, in turn, points to an inode file 660 that, as noted, has the same inode structure/content as the aggregate with the exceptions noted above. Each vvol 650 has its own inode file 660 and distinct inode space with corresponding inode numbers, as well as its own root (fsid) directory 670 and subdirectories of files that can be exported separately from other vvols.

The storage label file 690 contained within the hidden metadata root directory 630 of the aggregate is a small file that functions as an analog to a conventional raid label. A raid label includes "physical" information about the storage system, such as the volume name; that information is loaded into the storage label file 690. Illustratively, the storage label file 690 includes the name 692 of the associated vvol 650, the online/offline status 694 of the vvol, and other identity and state information 696 of the associated vvol (whether it is in the process of being created or destroyed).

A container file is a file in the aggregate that contains all blocks used by a vvol. The container file is an internal (to the aggregate) feature that supports a vvol; illustratively, there is one container file per vvol. The container file is a hidden file (not accessible to a user) in the aggregate that holds every block in use by the vvol. As noted, the aggregate includes an illustrative hidden metadata root directory that contains subdirectories of vvols:

WAFL/fsid/filesystem File, Storage Label File

Figure 7:
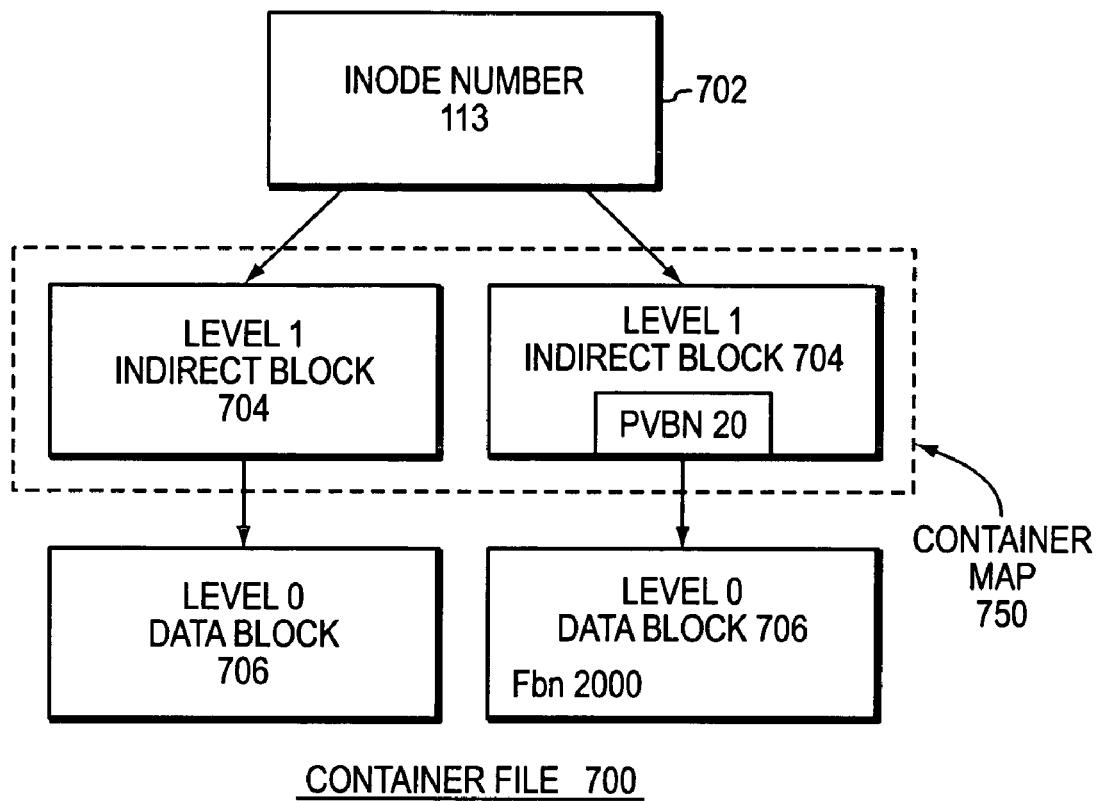
FIG. 7 is a schematic block diagram of a container file that may be advantageously used with the present invention.

Specifically, a "physical" file system (WAFL) directory includes a subdirectory for each vvol in the aggregate, with the name of subdirectory being a file system identifier (fsid) of the vvol. Each fsid subdirectory (vvol) has at least two files, the filesystem file 640 and the storage label file 690. The filesystem file is a large sparse file that contains all blocks owned by a vvol and, as such, is referred to as the container file for the vvol. FIG. 7 is a schematic block diagram of a container file 700 (buffer tree) that is assigned a new type and has an inode 702 that is assigned an inode number equal to a virtual volume id (vvid) of the vvol, e.g., container file 700 has an inode number 113. The container file is essentially one large virtual disk and, since it contains all blocks owned by its vvol, a block with vvbn X in the vvol can be found at fbn X in the container file. For example, vvbn 2000 in a vvol can be found at fbn 2000 in its container file 700. Since each vvol has its own distinct vvbn space, another container file may have fbn 2000 that is different from fbn 2000 in the illustrative container file 700.

Assume that a level 0 block 706 of the container file 700 has an fbn 2000 and an indirect (level 1) block 704 has a block pointer referencing the level 0 block 706, wherein the block pointer has a pvbn 20. Thus, location fbn 2000 of the container file 700 is pvbn 20 (on disk). Notably, the block numbers are maintained at the first indirect level (level 1) of the container file 700; e.g., to locate block 2000 in the container file, the file system layer accesses the 2000$^{th}$ entry at level 1 of the container file and that indirect block provides the pvbn 20 for fbn 2000.

In other words, level 1 indirect blocks of the container file contain the pvbns for blocks in the file and, thus, "map" vvbns-to-pvbns of the aggregate. Accordingly, the level 1 indirect blocks of the container file 700 are configured as a "container map" 750 for the vvol; there is preferably one container map 750 per vvol. The container map provides block pointers from fbn locations within the container file to pvbn locations on disk. Furthermore, there is a one-to-one correspondence between fbn locations in the container file and vvbn locations in a vvol.

Figure 8:
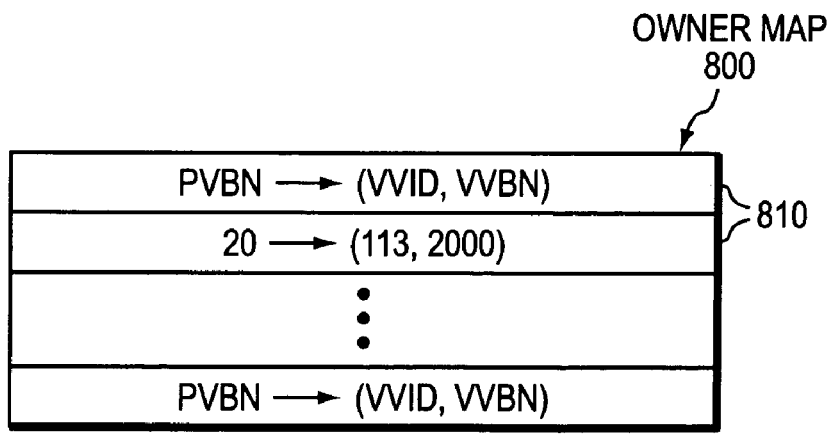
FIG. 8 is a schematic block diagram of an owner map that may be advantageously used with the present invention.

While the container map 750 provides a "forward" mapping of vvbn-to-pvbn, an owner map provides a "backward" mapping between pvbn-to-vvbn (and vvid). In particular, mapping metadata of the owner map provides a backward mapping between each pvbn in the aggregate to (i) a vvid that "owns" the pvbn and (ii) the vvbn of the vvol in which the pvbn is located. FIG. 8 is a schematic block diagram of an owner map 800 that may be advantageously used with the present invention. The owner map 800 may be embodied as a data structure having a plurality of entries 810; there is preferably one entry 810 for each block in the aggregate.

In the illustrative embodiment, each entry 810 has a 4-byte vvid and a 4-byte vvbn, and is indexed by a pvbn. That is, for a given block in the aggregate, the owner entry 810 indicates which vvol owns the block and which pvbn it maps to in the vvbn space, e.g., owner entry 810 indexed at pvbn 20 has contents vvid 113 and vvbn 2000. Thus when indexing into the owner map 800 at pvbn 20, the file system 280 accesses a vvol having an inode 113 (which is container file 700) and then accesses block location 2000 within that file. Each entry 810 of the owner map 800 is only valid for blocks that are in use and a vvol only owns those blocks used in the contained file system.

The present invention is directed to a technique for converting a stream of vvbns into a hybrid vvol file system containing both pvbns and vvbns. The stream of vvbns is illustratively embodied as a file system data stream of a vvol image that is transferred by source storage system 120$_S$ ("source") to destination storage system 120$_D$ ("destination") in accordance with image transfer operations, such as volume copying and synchronous or asynchronous mirroring, provided by a volume replication facility. The blocks that are sent as part of the image transfer are selected from a container file of a vvol on the source. Transfer of the vvol image involves converting a file system on the source vvol into the file system data stream (i.e., a "pure" vvol stream), where all blocks of the vvol are represented by vvbns. The file system data stream is then transferred to the destination, where the vvbns of the pure vvol stream blocks are converted to pvbns of a hybrid stream. The technique for converting a pure vvol stream into a hybrid stream is referred to herein as "destination swizzling".

In the illustrative embodiment, the Data ONTAP operating system leverages the WAFL snapshot capability to provide an automated volume replication (duplication) facility 260 called the SnapMirror facility. SnapMirror technology allows asynchronous mirroring of an image (e.g., a data set) between the source and destination to thereby enable, among other things, remote maintenance of consistent copies of the source's data on the destination. As used herein, a data set is defined as one or more storage units, such as vvols, that when combined represent data being served, migrated and/or protected. In this sense, the duplicated data set could include all or part of a file system. In addition, the source is a physical storage system that is serving a client's data set and the destination is the same or different physical storage system functioning as a "target" of a data set being served from the source. The destination may also serve its own independent data set. Examples of techniques for duplicating all or part of a volume (file system) are described in U.S. patent application Ser. Nos. 09/127,497 titled File System Image Transfer, by Kleiman et al, filed Jul. 31, 1998 and 09/426,409 titled File System Image Transfer Between Dissimilar File Systems, by Kleiman et al., filed Oct. 25, 1999, which are hereby incorporated by reference.

In a level 0 block image transfer, all appropriate blocks from the source container file on the source vvol are sent to the destination. On the other hand, a level 1 block image transfer is essentially an incremental transfer wherein only those blocks that have changed are sent to the destination. In accordance with such an image transfer, the volume replication facility 260 may examine snapmaps (i.e., snapshotted copies of the active maps) to determine which blocks are in use in snapshots on the source. That is, the facility may examine differences between the snapmaps to determine which blocks are new and formulates a stream of these blocks for transfer to the destination.

As each block of the image transfer is retrieved from disk at the source, the facility consults an owner map 800 and cooperates with a source swizzling engine to translate each pvbn block pointer to a vvbn block pointer before sending the block to the destination. An example of a technique used to translate pvbns to vvbns prior to an image transfer is described in U.S. patent application Ser. No. 10/951,196 titled Technique for Translating a Hybrid Virtual Volume File System into a Pure Virtual File System Data Stream filed herewith, which application hereby incorporated by reference. The facility also examines block type and level bits on the source vvol to determine the type of each block (indirect block, inode file block, level 0 block, etc.) and the locations of block pointers within each type of block retrieved from disk. The following is a list of block types that have block pointers, as well as the quantity of block pointers for each type:

(a) all indirect blocks, i.e., level 1 blocks and higher, wherein the quantity of block pointers for each indirect block in a hybrid ("non-dual") vvol is 1024 block pointers and for a dual-vbn hybrid ("dual") vvol is 510 pointers;

(b) inode file level 0 blocks (if the size of the file represented by the inode is greater than 64 bytes), wherein the quantity of block pointers for each level 0 block in a non-dual vvol is 16 block pointers and for a dual vvol is 8 pointers;

(c) fsinfo blocks (each with an embedded inode of the inode file), wherein the quantity of block pointers for each fsinfo block in a non-dual vvol is 16 block pointers and for a dual vvol is 8 pointers; and (d) volinfo blocks, each with 255 block pointers for the active fsinfo block and up to 255 snapshots.

A "pure" WAFL vvol stream (i.e., a vvol wherein block pointers and block allocation bitmaps are synchronized and consistent in the same vvbn space) of blocks is then sent as an image transfer over the network from the source $120_S$ by the volume replication facility 260 to the destination $120_D$.

Note that the image transfer and the inventive destination swizzling technique are illustratively directed to the granularity of a vvol. The vvol stream is sent in accordance with a volume replication protocol that is configured to include header blocks holding the block type and level bits information identifying each block, along with the vvbn of the block. The vvbn and block type/level bits are illustratively sent as an information pair with the image transfer stream. The bits portion of the vvbn/bits information pair identifies the type and level of block so that a determination can be made as to which blocks need swizzling. Note that the format of the stream may be different depending upon the protocol, but the content (vvbn/block type and level bits) is generally the same.

In the illustrative embodiment, a swizzling engine 265 on the destination cooperates with the volume replication facility 260 and file system 280 to receive the file system data stream output from the source and process the contents (blocks) of the data stream. The volume replication facility illustratively comprises a plurality of processes or threads within the storage operating system 200 including reader, processor and writer threads. Broadly stated, the reader thread receives the file system data stream of vvbn/bits pairs and corresponding data (vvol) blocks, and determines if destination swizzling is required. If so, the reader passes the information to the processor thread that cooperates with the destination swizzling engine 265 to perform the transformation (processing) of the information, including any virtual-to-physical mapping transformation. The transformed information is then passed to the writer thread that dispatches the information to a location, e.g., a container file.

Transfer Stage

The volume replication facility 260 on the destination $120_D$ receives the pure vvol blocks of the image during a transfer stage of the present invention. The received blocks are stored in either (1) a container file (similar to container file 700) of a destination vvol, where the block pointers of those blocks are swizzled "in place" or (2) a sparse temporary blocks staging file, where the block pointers of those blocks are swizzled as they are moved from the staging file to the container file. The difference between these two approaches depends on when it is desired to perform destination swizzling. All blocks of the transferred image have assigned vvbns. The vvbn of each block indicates a logical offset within the container file (i.e., the container map) or staging file so that the block is simply placed at the indicated block offset.

Figure 9:
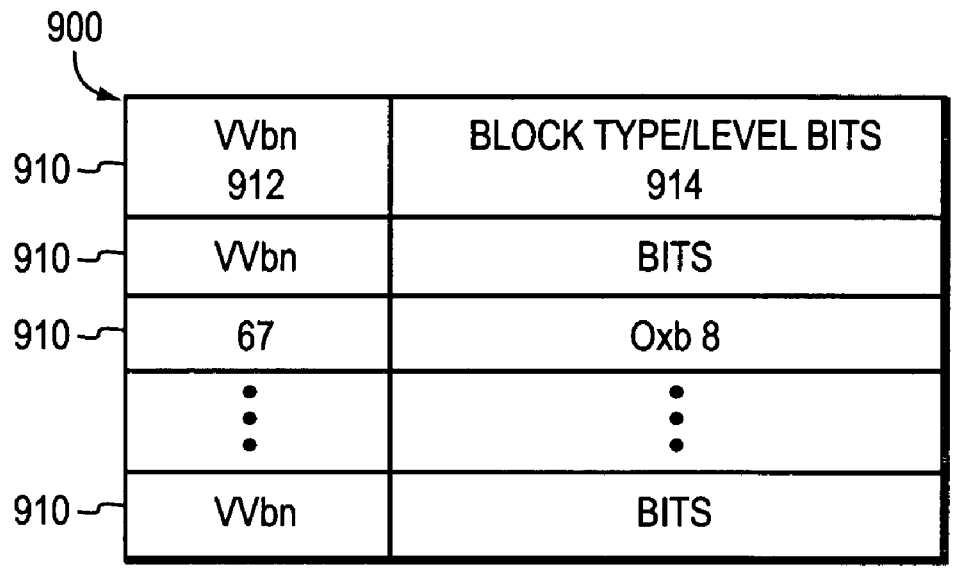
FIG. 9 is a schematic block diagram of a bits staging file that may be advantageously used with the present invention.

The block type and level bits (identifying information) for indirect blocks and inode file blocks, as well as for metafile blocks are saved in a temporary bits staging (SM_bits) file. The block type bits are used to determine which blocks to "swizzle" once all the blocks have been transferred. Optimizations, such as writing a "chunk" of blocks and bits as they are received (write combining), may be made to facilitate performance during this transfer stage. FIG. 9 is a schematic block diagram of the bits staging file 900 that is illustratively configured as a table having a plurality of entries 910, each holding a vvbn 912 and block type/level bits 914 received from the image transfer stream. The bits staging file 900 is stored in the same hidden metadata root directory 630 as the filesystem file 640 and storage label file 690. Each entry 910 of the file 900 is illustratively 8 bytes in length, wherein 4 bytes are allocated for the vvbn 912 and 4 bytes (of which only one byte is illustratively used) for the identifying information bits 914. Of the 8 information bits used within each entry, three bits are level bits (0–7 levels of blocks are supported) and 5 bits are type bits (32 types of blocks are supported). Of interest to the present invention are those blocks types that indicate the locations of block pointers within the blocks.

An optimization to the transfer stage involves only storing vvbn/block type and level bits pairs for certain block types, such as indirect blocks, inode file level 0 blocks and other types of blocks that require destination swizzling. As an image transfer takes place, the bits staging file 900 is created with each vvbn/bit pair entry 910 being loaded into the file as a sequential list. In an alternate embodiment, each vvbn/bit pair entry 910 may be indexed in the bits staging file 900 by its vvbn 912. Blocks that do not require swizzling (e.g., level 0 blocks of regular files) are placed in the container file (hereinafter container file 700) and are write allocated. Write allocation results in selection of pvbns for those blocks; the selected pvbns are then inserted into a container map (hereinafter container map 750) of the container file to provide vvbn-to-pvbn mappings for the blocks. Notably, the transfer stage of the present invention involves construction of the container file 700 for the destination vvol, wherein incremental changes of the image transfer are accumulated and all blocks are written to disk in accordance with a write allocation policy.

An example of a write allocation policy that may be advantageously used with the present invention is described in U.S. patent application Ser. No. 10/836,817 titled, Extension of Write Anywhere File Layout Write Allocation, by John K. Edwards and assigned to Network Appliance, Inc. Broadly stated, block allocation proceeds in parallel on the destination vvol and aggregate when write allocating a block within the vvol, with a write allocator 282 (FIG. 2) selecting a pvbn in the aggregate and a vvbn in the vvol. The write allocator adjusts block allocation bitmap structures, such an active map and space map, of the aggregate to record the selected pvbn and adjusts similar structures of the vvol to record the selected vvbn. A vvid of the vvol and the vvbn are inserted into owner map 800 of the aggregate at an entry defined by the selected pvbn. The selected pvbn is also inserted into container map 750 of the destination vvol. Finally, an indirect block or inode file parent of the allocated block is updated with one or more block pointers to the allocated block. The content of the update operation depends on the vvol embodiment. For a hybrid vvol embodiment, the selected pvbn is inserted in the indirect block or inode as a block pointer. However, for a dual vbn hybrid vvol embodiment, both the pvbn and vvbn are inserted in the indirect block or inode as block pointers.

Figure 10:
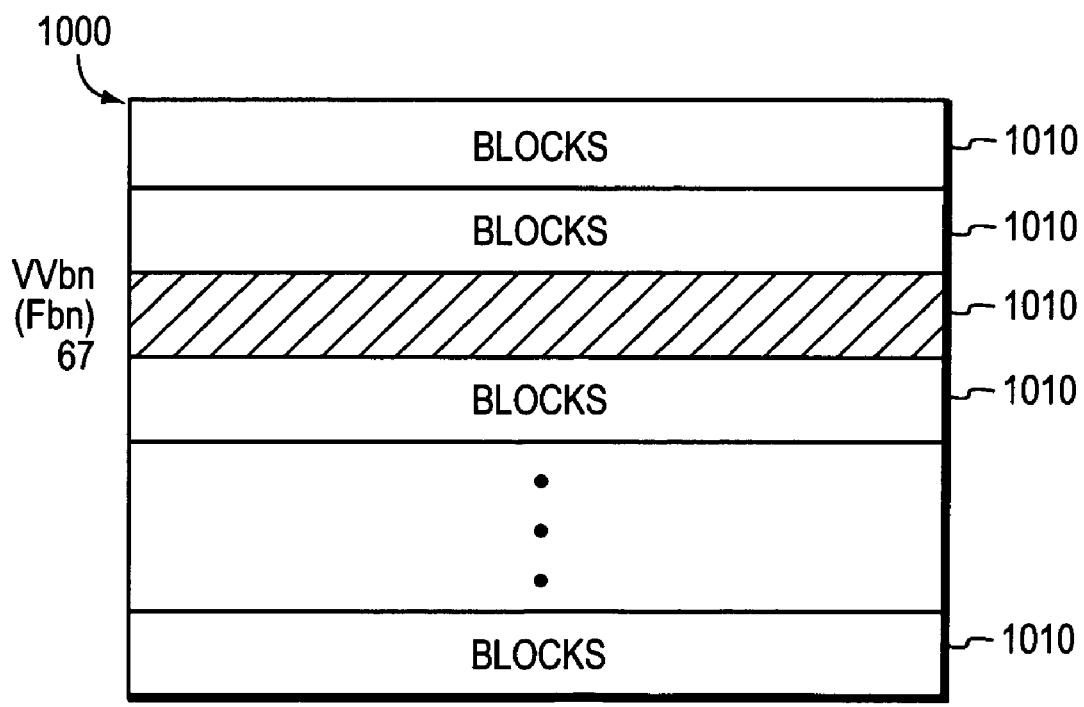
FIG. 10 is a schematic block diagram of a blocks staging file that may be advantageously used with the present invention.

Specifically, the blocks arrive at the destination with vvbn pointers and those blocks are placed at appropriate logical offsets into the container file 700 or blocks staging file. FIG. 10 is a schematic block diagram showing an embodiment of the blocks staging file 1000 of a destination vvol that is used to stored blocks received from an image transferred from a source. In the illustrative embodiment, the blocks staging file 1000 comprises a plurality of 4 kB block entries 1010. The entries 1010 are indexed by vvbn; note that the vvbn of a block is the fbn in the container file 700. For example, assume that vvbn 67 is received over the network at the destination with identifying information bits 0xb8. The data for that block is placed at an index/offset 67 in the blocks staging file 1000, whereas an entry 910 of the bits staging file 900 is loaded with the identifying information bits pair (67/0xb8).

Illustratively, the bits staging file 900 and the blocks staging file 1000 are temporary files that are used for swizzling only one (the immediate) image transfer. The volume replication protocol generally involves a negotiation phase where the size of the image transfer is exchanged between the source and destination. Therefore, an appropriately sized file (the blocks staging file or container file) can be allocated/created. The blocks staging file 1000 is preferably a log of changes that grows dynamically as entries are appended thereto; because not all blocks change in every image transfer update, the file 1000 is illustratively a sparse file. However, the size of the container file 700 must be known as that file must be at least as large as the source side image being transferred.

Operationally, a pure vvol stream of blocks is received at destination $120_D$ from the source $120_S$. The blocks represent incremental changes to the vvol as part of an image transfer. Each block of the stream is loaded either directly into the container file 700 for the vvol or the blocks staging file 1000 prior to being moved into the container file. In the latter case, the blocks may be placed into the container file 700 by virtue of the write allocation policy, which places those blocks in unused spaces in the destination vvol. This transfer stage procedure continues for all of the various blocks received during the image transfer.

Swizzling Stage

After all blocks in the image transfer are received at the destination, a destination swizzling procedure is performed. As described further herein, a defined swizzling order of blocks is provided (for each snapshot), summarized as follows:

(1) level 1 blocks of all files except the inode file;
(2) level 2 blocks of all files except the inode file;
(3) . . . up to a maximum level −1;
(4) inode file level 0 blocks;
(5) inode file level 1 blocks;
(6) . . . up to a maximum top level −1 of the inode file (depending on the size of the inode file, which depends on the number of inodes in the vvol which, in turn, depends on the size of the vvol);
(7) fsinfo and volinfo blocks (as a cycle)

Note that most level 0 blocks do not require swizzling; only certain level 0 blocks require destination swizzling. That is, most level 0 blocks do not have block pointers and thus do not require swizzling as they have been write allocated along with other blocks loaded into the container file on the destination. Once the blocks (level 0 blocks as well as level 1 blocks, etc.) have been write allocated, those blocks are assigned pvbns.

More specifically, once the level 0 blocks have been loaded into the container file 700 of the destination vvol and have been write allocated, the container map 750 of that file has vvbn-to-pvbn mappings for those blocks. The next level (level 1) indirect blocks are then swizzled during a swizzling stage of the inventive technique. The swizzling stage involves conversion of the pure vvol stream into a hybrid stream implementation that makes the vvol usable, i.e., the swizzling stage refers to the actual conversion of a vvbn to a pvbn. According to the invention, destination swizzling involves using each non-zero block pointer in a block as an index into the container map 750 of the destination vvol and replacing the vvbn pointer in the block with a pvbn pointer. That is, for each non-zero block pointer 405 in an indirect block 404, the container map 750 is consulted and the vvbn pointer is replaced with its corresponding pvbn pointer.

Conversion of the "pure" vvbn blocks to hybrid (pvbn) blocks preferably occurs within the pvbn space of the aggregate on the destination. The destination swizzling technique includes a destination swizzling algorithm that illustratively defines a specific order in which the vvbns are translated to pvbns of the destination; pure vvbn to hybrid pvbn conversion occurs in order because a pvbn is assigned to a block once it has been write allocated on the destination. Specifically, any blocks that do not have pointers (e.g., level 0 data blocks of regular files) do not have to be swizzled. Since these level 0 blocks are data blocks, they are written (via write allocation) to their final destinations in the aggregate (via the container file). Therefore, destination swizzling begins with level 1 blocks that point to those level 0 blocks. The vvbn pointers in the level 1 blocks that point to the level 0 data blocks can be changed to pvbns because the pvbns of the level 0 blocks are now final. This swizzling order is defined because of the "bottom up" approach from, e.g., level 0 to level 1, which blocks point to other blocks after those blocks they point at have arrived at their final locations (pvbns of those blocks are known).

It should be noted that the blocks in the container file 700 (or blocks staging file 1000) are in files in the aggregate and when they are write allocated, pvbns are chosen/assigned to them. The chosen pvbns are then inserted into the block pointers of the indirect blocks within the container file (the container map 750) to provide a vvbn to pvbn translation/mapping. Note also that if the temporary blocks staging file 1000 is used, the same translation information is provided as those blocks within the staging file are moved into the container file 700.

Therefore, according to the inventive technique, blocks that need to be swizzled can be processed after all blocks they point at have been swizzled (and if they are in the blocks staging file 1000, moved into the container file 700). As blocks are swizzled and, if required, moved into the container file, more blocks become eligible for swizzling and, optionally, moving. Swizzling starts with level 1 indirect blocks, since all level 0 blocks (other than level 0 inode file blocks which themselves hold block pointers) are already in place and have pvbns assigned to them after the transfer stage. In particular, swizzling of the indirect blocks starts at the level 1 indirect blocks and proceeds to the maximum level of indirect blocks allowed by the file system. For example, swizzling starts with level 1 blocks of all files except the inode file, then proceeds to level 2 blocks of all files except the inode file and continues to the maximum level of indirect blocks of all files except the inode file. The vvol on the destination takes a consistency point (CP) after each level of indirect blocks is swizzled to update the on-disk image of the indirect blocks so that the next level of blocks has pvbns at which to point. Next, level 0 inode file blocks are swizzled followed by level 1 indirect inode file blocks and so on until all the inode file blocks have been swizzled. That is, swizzling then proceeds with inode level 0 blocks, level 1 blocks and onto the top-level blocks stored in the fsinfo blocks.

As noted, the swizzling engine 265 (comprising vvbn-to-pvbn conversion code) is used to perform destination swizzling and, to that end, executes at the completion of receipt of the image transfer by the volume replication facility 260. That is, the processor thread of the facility 260 illustratively calls into an interface for the swizzling engine 265 once all of the blocks of an image transfer have been transferred from the source to the destination. The swizzling engine 265 cooperates with the volume replication facility 260 and file system 280 to perform the destination swizzling technique through the exchange of messages.

Figure 11:
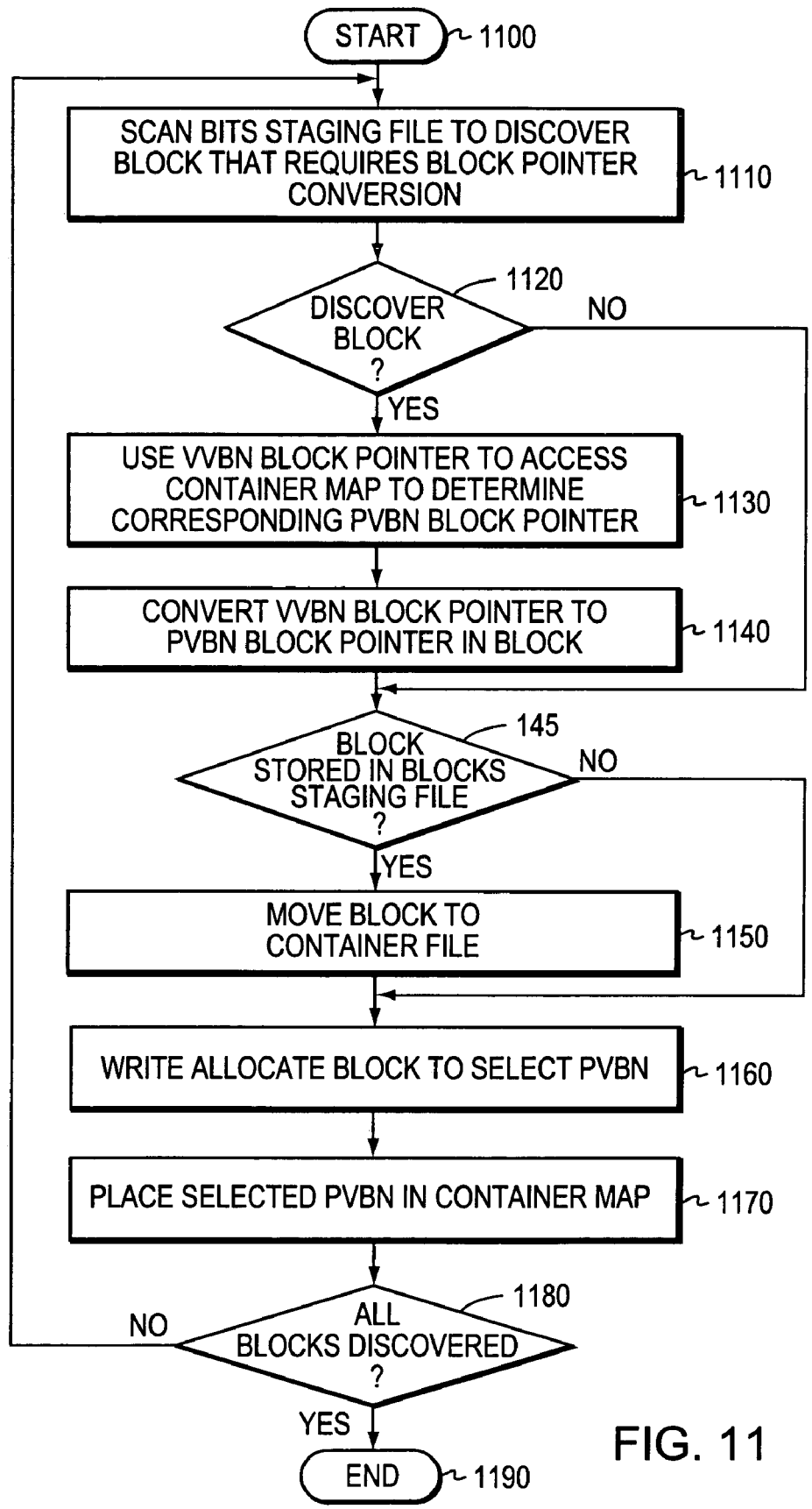
FIG. 11 is a flowchart illustrating a procedure for performing a novel destination swizzling technique of the present invention.

FIG. 11 is a flowchart illustrating a procedure for performing the novel destination swizzling technique of the present invention. The procedure starts at Step 1100 and proceeds to Step 1105 where the bits staging file 900 is scanned by the swizzling engine to discover blocks that require swizzling (as indicated by the block type and level bits). Broadly stated, the swizzling technique begins by swizzling all indirect blocks (level 1, level 2 and higher) of regular files and then swizzling all inode file blocks (e.g., inode level 0 and indirect blocks). The inode is a special block because it contains block pointers; thus, inodes require consultation of the block type and level bits and, as such, also have entries in the bits staging file 900. If the block type bits indicate that the block is an inode block type and the level bits indicate that it is a level 0 (or higher) block, then the pointers in the block must be swizzled. Depending upon the type of inode, there may be different numbers of block pointers. Each level 0 block of the inode file has block pointers to indirect blocks, unless the size of the file is small enough (64 bytes) to contain the actual data. In this latter case, there are no block pointers in the level 0 block (inode) of the inode file. If the block contains pointers, it must be swizzled and if the block contains data, there is no requirement for swizzling.

It should be noted that within an image transfer there may be different formats of blocks that are captured by the block type and level bits to indicate their type of block formats, e.g., indirect blocks and inode file level 0 (and higher) blocks, as well as fsinfo and volinfo blocks. Certain level 0 blocks, such as inodes (of an inode file), fsinfo blocks and volinfo blocks, contain block pointers and, as such, require swizzling. However, the fsinfo and volinfo blocks require further special handling during swizzling. Referring to FIG. 6, each fsinfo block 654 contains a disk inode for the inode file 660 for a file system (or snapshot), while the volinfo block 652 contains pointers to the fsinfo blocks 654 for all snapshots in a volume. It should be noted that the volinfo block 652 referred to here is not the volinfo superblocks at vvbns 1 and 2 for the active file system. Rather, this volinfo block is part of the volinfo metafile and is a copy of the volinfo block for the active file system. Accordingly, the fsinfo and volinfo blocks are part of the fsinfo and volinfo metafiles (not shown), respectively, and are 4 K bytes (one block) in size. Each of these blocks (files) have an inode that points to indirect blocks, which point to (fsinfo and/or volinfo) data blocks that, in turn, point back to the volinfo block 652 and fsinfo blocks 654. Thus, a "cycle" of vvbns is present that must be swizzled atomically (within the same CP).

Referring again to FIG. 11 and, specifically to Step 1110, the swizzling engine initially scans the bits staging file to discover a block (e.g., a level 1 indirect block of a regular file) that requires swizzling (block pointer conversion). Recall that level 0 blocks of regular files do not need swizzling. In Step 1120, a determination is made as to whether such a block is discovered in either the container file 700 or blocks staging file 1000. If not but rather, e.g., a level 0 data block is discovered, the procedure jumps to Step 1145. Otherwise if, e.g., a level 1 indirect block is discovered, each vvbn block pointer in the indirect block is used to access the appropriate block in the container map 750 to determine the corresponding pvbn in the aggregate space (Step 1130). In Step 1140, the swizzling engine swizzles the indirect block (the vvbn block pointer is converted to a pvbn block pointer). In Step 1145, a determination is made as to whether the block is stored in the blocks staging file 1000. If not, the procedure jumps to Step 1160; otherwise, the swizzled block is moved into the container file 700 in Step 1150. In this context, "moving" denotes moving the block with swizzled block pointers into the container file and marking that block as dirty so that it can be write allocated. In Step 1160, the block is write allocated to select a pvbn for the block and, in Step 1170, the selected pvbn is placed in the container map. Thus, for each block pointer that has a non-zero value, the container map is consulted to determine the vvbn-to-pvbn mapping and the vvbn value is then replaced with a pvbn value. In Step 1180, a determination is made as to whether all level 1 indirect blocks have been discovered. If not, the sequence returns to Step 1110 and proceeds through Steps 1170.

Once all level 1 indirect blocks are discovered and swizzled, the swizzling engine proceeds to discover and swizzle all level 2 indirect blocks of regular files in accordance with the procedure described in FIG. 11. Thereafter, the engine 265 continues discovering and swizzling any higher level indirect blocks of regular files, followed by all inode file blocks and, eventually, the cycle of fsinfo and volinfo blocks, again in accordance with the procedure described in FIG. 11. It should be noted that the swizzling engine 265 identifies the cycle of blocks before swizzling is initiated. That is, the engine begins destination swizzling of blocks in the order previously described until only the cycle of fsinfo and volinfo blocks is left. The cycle of blocks is then swizzled atomically before those blocks are write allocated. In this context, "atomically" means marking these blocks dirty and marking the inode for the container file with a special flag. That is, the blocks are marked dirty for write allocation and a special flag is set on the container file inode so that the write allocator 282 knows that these blocks need to be swizzled prior to flushing them to disk. Illustratively, the special flag specifies "once these blocks are write allocated (pvbns are selected), but before they are flushed to disk, call back to the swizzling engine" so that the blocks are swizzled (vvbns are converted to pvbns) and then they may be flushed to disk. Special care is taken for cycle-detection and handling so that no blocks in a cycle are swizzled twice. A global linked list is maintained for all cycle data structures to deal with multiple simultaneous destination stream transfers and conversions. The procedure then ends at Step 1190.

The novel destination swizzling technique applies equally to a hybrid vvol arrangement (wherein only pvbns are stored as indirect block pointers) as well as a dual vbn approach (wherein both vvbns and pvbns constitute the block pointers). The indirect blocks of the dual vbn approach have a different format than the indirect blocks of the hybrid approach since the block pointers are in different positions within those blocks. In the illustrative dual vbn case, every other block pointer is a pvbn that requires swizzling. Nevertheless, the basic destination swizzling algorithm described herein remains the same for either approach. For example, destination swizzling of a hybrid vvol that is sent from a source to a destination involves converting the vvbns of the blocks received at the destination to pvbns. In the dual vbn approach, the incoming blocks of the vvol have vvbns and placeholders (spaces) for pvbns which, at this time, are "unknown". An example of a technique for providing placeholders for unknown pvbns is described in U.S. patent application Ser. No. 10/972,817 titled, System and Method for Using PVBN Placeholders in a Flexible Volume of a Storage System, by Ashish Prakash et al. and assigned to Network Appliance, Inc. The novel destination swizzling technique fills in those unknown spaces with pvbns corresponding to the vvbns.

Advantageously, the present invention allows vvols to be transferred and mirrored by taking a pure vvol stream of vvbns and converting it into a usable vvol file system on a destination. The novel destination swizzling technique may be used for volume copying, as well as synchronous and asynchronous mirroring. The use of write combining and staging files, as well as block type and level bit optimizations to swizzle only when required, are performance optimizations for the inventive technique.

While there has been shown and described illustrative embodiments of a technique that converts a stream of vvbns into a hybrid vvol file system containing both pvbns and vvbns, it is to be understood that various other adaptations and modifications may be made within the spirit and scope of the invention. For example, in an alternate embodiment of the invention, there can be multiple volumes that are destinations at any given time. Moreover, as an optimization to the destination swizzling technique, multiple image transfers may be combined within the same staging files (as long as they do not "stomp" on one another) and may be swizzled in bulk (at once).

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for converting a stream of virtual volume (vvol) image blocks having virtual volume block number (vvbn) block pointers into a hybrid vvol file system containing both physical volume block number (pvbn) block pointers and vvbn block pointers, the method comprising the steps of:
   determining pvbn block pointers for the vvbn block pointers of a block in the vvol image;
   converting the vvbn block pointers of the block to the determined pvbn block pointers;
   write allocating the block to select a pvbn block pointer for the block; and
   placing the selected pvbn block pointer into a container map configured to provide vvbn-to-pvbn mappings.

2. The method of claim 1 wherein the set of determining comprises the step of consulting the container map for each vvbn block pointer that has a non-zero value to obtain a vvbn-to-pvbn mapping for the block pointer.

3. The method of claim 1 further comprising the step of using block type and level bits to discover blocks in the vvol image that require block pointer conversion.

4. The method of claim 3 wherein the step of using comprises the step of scanning a bits staging file to obtain the block type and level bits associated with each block in the vvol image.

5. The method of claim 3 further comprising the step of transferring the stream of vvol image blocks from a source to a destination in accordance with image transfer operations.

6. The method of claim 5 wherein the source is a storage system and the destination is one of the same or different storage system.

7. The method of claim 5 wherein the image transfer operations are one of volume copying, synchronous mirroring and asynchronous mirroring.

8. A system adapted to convert a stream of virtual volume block numbers (vvbns) of a virtual volume (vvol) image transferred from a source to a destination into a hybrid vvol file system containing both physical volume block numbers (pvbns) and vvbns, the system comprising:

a first file adapted to store blocks of the vvol image, wherein a vvbn in each block indicates a logical offset within the first file at which the block is placed;

a second file adapted to store block type and level bits used to identify which blocks to convert; and a swizzling engine adapted to convert the vvbn in each block to a pvbn to thereby allow conversion of the transferred vvol image from the source into a usable destination vvol on the destination.

9. The system of claim 8 further comprising a container file of the destination vvol, the container file adapted to contain all blocks of the destination vvol and having a container map adapted to provide a vvbn-to-pvbn mapping of blocks in the destination vvol.

10. The system of claim 9 wherein the swizzling engine is further adapted to use each non-zero block pointer in each block as an index into the container map of the destination vvol to replace the vvbn in the block with the pvbn.

11. The system of claim 10 wherein the first file is one of a blocks staging file and the container file of the destination vvol.

12. The system of claim 11 wherein the blocks identified for conversion by block type and level bits are indirect blocks and inode file blocks, as well as metafile blocks.

13. Apparatus adapted to convert a stream of virtual volume (vvol) image blocks having virtual volume block number (vvbn) block pointers into a hybrid vvol file system containing both physical volume block number (pvbn) block pointers and vvbn block pointers, the apparatus comprising:

means for determining pvbn block pointers for the vvbn block pointers of a block in the vvol image;

means for converting the vvbn block pointers of the block to the determined pvbn block pointers;

means for write allocating the block to select a pvbn block pointer for the block; and means for placing the selected pvbn block pointer into a container map configured to provide vvbn-to-pvbn mappings.

14. The apparatus of claim 13 wherein the means for determining comprises means for obtaining a vvbn-to-pvbn mapping for each vvbn block pointer that has a non-zero value.

15. The apparatus of claim 14 wherein the means for obtaining comprises means for consulting a container map.

16. The apparatus of claim 13 further comprising means for discovering blocks in the vvol image that require block pointer conversion.

17. The apparatus of claim 16 wherein the means for discovering comprises means for using block type and level bits associated with the blocks.

18. A computer readable medium containing executable program instructions for converting a stream of virtual volume (vvol) image blocks having virtual volume block number (vvbn) block pointers into a hybrid vvol file system containing both physical volume block number (pvbn) block pointers and vvbn block pointers, the executable instructions comprising one or more program instructions for:

determining pvbn block pointers for the vvbn block pointers of a block in the vvol image;

converting the vvbn block pointers of the block to the determined pvbn block pointers;

write allocating the block to select a pvbn block pointer for the block; and placing the selected pvbn block pointer into a container map configured to provide vvbn-to-pvbn mappings.

19. The computer readable medium of claim 18 wherein the program instructions for determining comprises one or more program instructions for consulting the container map for each vvbn block pointer that has a non-zero value to obtain a vvbn-to-pvbn mapping for the block pointer.

20. The computer readable medium of claim 19 further comprising one or more program instructions for using block type and level bits to discover blocks in the vvol image that require block pointer conversion.

* * * * *